United States Patent
Mizuguchi et al.

(10) Patent No.: US 8,945,650 B2
(45) Date of Patent: Feb. 3, 2015

(54) MANUFACTURING METHOD AND MANUFACTURING APPARATUS FOR BAUMKUCHEN

(75) Inventors: Shinya Mizuguchi, Nagoya (JP); Nobutaka Torii, Nagoya (JP); Masakazu Komatsu, Nagoya (JP); Yuji Sakatani, Nagoya (JP); Seiji Yamada, Nagoya (JP)

(73) Assignee: Pasco Shikishima Corporation, Nagoya-Shi (JP)

( * ) Notice: Subject to any disclaimer, the term of this patent is extended or adjusted under 35 U.S.C. 154(b) by 2198 days.

(21) Appl. No.: 11/814,715

(22) PCT Filed: Oct. 6, 2006

(86) PCT No.: PCT/JP2006/320066
§ 371 (c)(1),
(2), (4) Date: Jul. 31, 2009

(87) PCT Pub. No.: WO2008/044272
PCT Pub. Date: Apr. 17, 2008

(65) Prior Publication Data
US 2009/0304888 A1 Dec. 10, 2009

(51) Int. Cl.
*A21D 10/04* (2006.01)
*A21D 8/06* (2006.01)
(Continued)

(52) U.S. Cl.
CPC . *A21D 8/06* (2013.01); *A21C 5/006* (2013.01); *A21D 13/0067* (2013.01)
USPC ........... 426/523; 426/496; 426/512; 426/514; 426/515; 426/552

(58) Field of Classification Search
USPC ......... 426/523, 549, 552, 512, 515, 297, 502, 426/302, 303, 304
See application file for complete search history.

(56) References Cited

U.S. PATENT DOCUMENTS 3,536,500 A * 10/1970 Cleereman et al. ........... 426/130

FOREIGN PATENT DOCUMENTS

DE 4302091 A1 * 7/1994
JP 46-4878 2/1971
(Continued)

OTHER PUBLICATIONS

WIPO English Translation of the Written Opinion of the International Search Authority (2006).*
(Continued)

*Primary Examiner* — Viren Thakur
(74) *Attorney, Agent, or Firm* — Seager, Tufte & Wickhem LLC (57) ABSTRACT

There are provided a manufacturing method and a manufacturing apparatus for Baumkuchen for easily and properly suppressing shape distortion of the Baumkuchen caused in a manufacturing process thereof. In manufacturing the Baumkuchen by alternately repeating application of batter around the whole outer circumference of a spit and baking of the applied batter, the batter is scraped off outer circumferences of opposite end portions of the spit before baking only in early stage of manufacturing until the number of repetitions reaches a specified value. As a result, the number of cake layers formed at the opposite end portions of the Baumkuchen is reduced from that at the other portion and outside diameters of the opposite end portions are reduced from a normal outside diameter to thereby suppress partial increase in the outside diameter at the opposite end portions of the Baumkuchen caused by drooping of the batter at the end portions of the spit before baking.

2 Claims, 6 Drawing Sheets (51) Int. Cl.
*A21C 5/00* (2006.01)
*A21D 13/00* (2006.01)

(56) References Cited

FOREIGN PATENT DOCUMENTS

| JP | 57-33530 A | 2/1982 |
| JP | 57-189629 A | 11/1982 |
| JP | 61-15734 Y2 | 5/1986 |
| JP | 5-233855 A | 9/1993 |
| JP | 2000354453 A * | 12/2000 |
| JP | 2005102630 A * | 4/2005 |
| JP | 3686671 B1 * | 8/2005 |
| JP | 2005245349 A * | 9/2005 |
| JP | 2006-129781 A | 5/2006 |

OTHER PUBLICATIONS

JP 57033530 translation from STIC (Feb. 10, 2012).*

* cited by examiner

Distance L from opposite ends of spit

MANUFACTURING METHOD AND MANUFACTURING APPARATUS FOR BAUMKUCHEN

FIELD OF THE INVENTION

The present invention relates to a manufacturing method and a manufacturing apparatus for Baumkuchen and specifically to an improvement of a manufacturing method and an apparatus for suppressing shape distortion in the Baumkuchen caused in a manufacturing process thereof.

BACKGROUND OF THE INVENTION

Baumkuchen, which originated in Germany, is a cylindrical cake having concentric stripes similar to the annual growth ring pattern in a cross section tree and is manufactured by repeating application of thick liquid batter around the whole outer circumference of a spit and baking of the applied batter. There are known Baumkuchen manufacturing apparatuses described in Patent Documents 1 to 4, for example. Each of the apparatuses includes a batter tank for storing batter to be applied onto the spit and a baking furnace for baking the batter applied on the spit. By orbiting the spit along a track disposed so as to alternately pass through the batter tank and the baking furnace, the repetition of the application and baking of the batter is automated. In each of the manufacturing apparatuses, the spit is caused to rotate on its axis during manufacturing to thereby make the thickness of applied batter uniform in the circumferential direction of the spit.

[Patent Document 1] Japanese Laid-Open Patent Publication No. 2006-129781

[Patent Document 2] Japanese Laid-Open Patent Publication No. 5-233855

[Patent Document 3] Japanese Examined Utility Model Publication No. 46-4878

[Patent Document 4] Japanese Examined Utility Model Publication No. 61-15734

SUMMARY OF THE INVENTION

Figure 9:
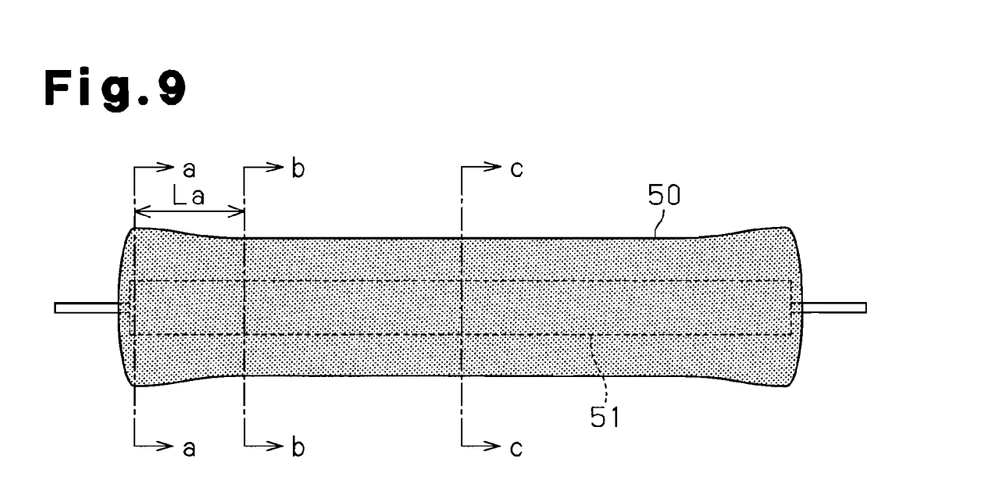
FIG. 9 is a side view of the Baumkuchen manufactured by the prior-art manufacturing method.
Figure 10A:
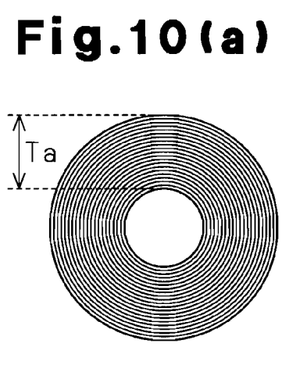
FIGS. 10(a) to 10(c) are cross-sectional views of respective portions of the Baumkuchen manufactured by the same prior-art manufacturing method.
Figure 10B:
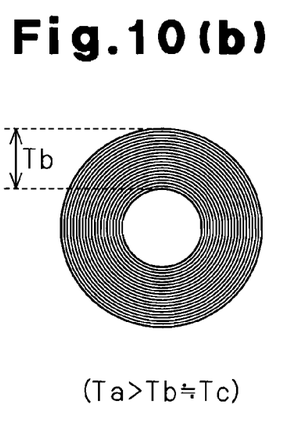
Figure 10C:
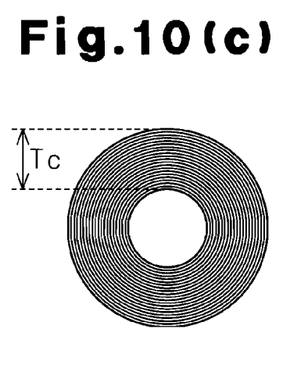

If the application and baking of the batter are simply repeated to manufacture the Baumkuchen, the outside diameter of the Baumkuchen 50 partially increases at opposite end portions as shown in FIG. 9, though the thickness of the applied batter is made uniform in the circumferential direction by rotating the spit. FIG. 10(a) shows a cross-section taken along line a-a in FIG. 9, i.e., a cross-section of the Baumkuchen 50 at an end portion of the spit 51, FIG. 10(b) shows a cross-section taken along line b-b in FIG. 9, i.e., a cross-section of the Baumkuchen 50 at a distance "La" from the end portion of the spit 51, and FIG. 10(c) shows a cross-section taken along line c-c in FIG. 9, i.e., a cross-section of the Baumkuchen 50 at a central portion of the spit 51. A thickness Ta of the cake at the opposite end portions of the Baumkuchen 50 is remarkably greater than thicknesses Tb, Tc of the case at a distance "La" from the opposite ends and at the central portion (Ta>Tb≈Tc). To give an actual example of numerical values, in a Baumkuchen formed of 23 cake layers each having a thickness "a little over 2 mm", partial increases in thickness occurred in opposite side areas having widths of about "100 mm" and a maximum increase in thickness was about "7 mm".

Such shape distortion of the Baumkuchen 50 is caused by drooping of the batter toward the outer circumferential side before baking due to the centrifugal force incident to the rotation of the spit, the batter applied on the opposite end faces of the spit perpendicular to a rotational axis. The Baumkuchen 50, the opposite end portions of which have increased outside diameters, does not meet size standards. Therefore the opposite end portions are cut off and disposed of or corrected to eliminate the shape distortion by manual work in the last stage of manufacturing, which reduces yields and productivity.

It is an objective of the invention to provide a manufacturing method and a manufacturing apparatus for Baumkuchen for easily and appropriately suppress shape distortion of Baumkuchen caused in a manufacturing process.

According to an aspect of the invention, there is provided a manufacturing method of Baumkuchen for manufacturing the Baumkuchen by alternately repeating application of batter around a whole outer circumference of a spit and baking of the applied batter. In this method, the batter is scraped off outer circumferences of opposite end portions of the spit before the baking of the batter only until the number of repetitions of application and baking of the batter reaches a specified value.

According to this method, the numbers of cake layers at the opposite end portions of the manufactured Baumkuchen are smaller than that at the other portion by the number corresponding to the specified value. As a result, outside diameters of the opposite end portions of the Baumkuchen can be reduced from normal outside diameters to thereby suppress shape distortion of the Baumkuchen in the above-described form having increased diameters at the opposite end portions.

Moreover, suppression of the shape distortion of the Baumkuchen according to this manufacturing method does not require worker skill and automation of the work does not require exacting control as will be described below. Consequently, it is easy to introduce the method.

The above-described correction of shape distortion of the Baumkuchen by scraping off batter can be carried out in intermediate and last stages of the repetitions of the application and baking of the batter. In other words, when the certain number of baked cake layers have been formed by repetition of the application and baking of the batter, the shape distortion may be corrected by scraping the newly applied batter off the outer circumferences of the opposite end portions while checking bulging degrees of the opposite end portions of the Baumkuchen during manufacturing. In this case, however, the baked cake layers already exist under the batter to be scraped off and it is necessary to finely adjust a force for scraping off the batter so as not to flatten or damage the cake layers. Moreover, if the newly applied batter is scraped off, an outer circumferential surface of the baked cake layer immediately under the scraped batter appears and is directly exposed to a heat source in baking and may be burned. In this regard, the batter is scraped off in the early stage of manufacturing in which there is no baked cake layer yet in the manufacturing method of the invention. Therefore, it is possible to easily scrape off the batter without fears of damage to and burning of the cake layers which have been baked already.

Moreover, proper values for the scraping width of the batter and the number of times scraping to perform for suppressing the shape distortion of the Baumkuchen can be obtained in advance by carrying out tests. If the scraping width of the batter and the number of scraping are specified in advance based on the results, it is possible to properly suppress shape distortion of the Baumkuchen only by mechanical routine that does not require special judgment of the situation. Therefore, the above-described scraping work of the batter does not require skill of a worker and exacting control and can be introduced easily.

The batter is preferably scraped off by pushing a distal end of a flat scraper against a surface of the outer circumference of the spit. In this case, by pushing the distal end of the flat scraper against the surface of the outer circumference of the spit, the scraping off of the batter can be carried out easily and properly.

Incidentally, if the shape distortion is not corrected at all, the outside diameter of the Baumkuchen increases toward each end. Therefore, it is preferable that scraping widths for the batter at the opposite end portions of the spit be discretely reduced as the number of repetitions of the application and baking of the batter increases. In this case, it is possible to further properly suppress the shape distortion of the Baumkuchen.

According to another aspect of the invention, there is provided a manufacturing apparatus for Baumkuchen comprising a batter tank for storing batter, a spit which is immersed into the batter tank to apply the batter around a whole outer circumference of it, and a baking furnace for baking the batter applied onto the spit. The apparatus causes the spit to alternately pass through the batter tank and the baking furnace to thereby manufacture the Baumkuchen. The apparatus includes a scraper provided in a path of the spit moving from the batter tank to the baking furnace to scrape off the batter applied onto outer circumferences of opposite end portions of the spit and a controller for controlling operation of the scraper so as to scrape off the batter only until the number of repetitions of the application and baking of the batter reaches a specified value.

With this structure, the scraper scrapes the batter off the opposite end portions of the spit until the number of repetitions of the application of the batter onto the spit in the batter tank and baking of the batter in the baking furnace reaches the specified value. Therefore, baking of the batter is carried out in a state in which the batter is not applied onto the opposite end portions of the spit in the early stage of manufacturing. On the other hand, after the number of repetitions exceeds the specified value, the scraping off of the batter is not carried out and the baking is carried out in a state in which the batter is applied around the whole outer circumference of the spit. As a result, the numbers of cake layers at the opposite end portions of the manufactured Baumkuchen are reduced from that of the other portion by the number corresponding to the specified value. As a result, increase in outside diameters of the opposite end portions can be suppressed. Because the scraping off of the batter in the manufacturing apparatus is carried out in the early stage of manufacturing in which no baked cake layer exists under the batter to be scraped off, it is possible to satisfactorily suppress the shape distortion without causing burning and the like even if exacting control of the operation of the scraper is not carried out in the scraping off.

The manufacturing apparatus preferably includes an actuator for causing the scraper to reciprocate in an axial direction of the spit. In this case, the widths of the batter to be scraped off at the opposite end portions of the spit can be changed by adjusting a moving amount of the scraper in the axial direction of the spit. If the scraping widths of the batter can be changed arbitrarily in this manner, variable setting of the scraping widths of the batter for each time and adjustment of the scraping widths of the batter according to the type of Baumkuchen become easy.

The controller preferably controls the operation of the scraper such that scraping widths of the batter at the opposite end portions of the spit are discretely reduced for each scraping off. In this case, by carrying out the scraping off of the batter while discretely reducing the widths, it is possible to further properly suppress the shape distortion of the Baumkuchen.

It is preferable that the controller can change the scraping widths of the batter in a programmable way. Moreover, it is preferable that the controller can change the number of times the batter is scraped off in a programmable way. In these cases, the scraping widths of the batter and the number of scraping off can be changed only by revision of software such as replacement of constants without changing hardware of the manufacturing apparatus at all. By structuring the controller in this manner, it is possible to extremely easily change the scraping widths and the number of scraping off and it is possible to impart high versatility to the manufacturing apparatus.

DESCRIPTION OF THE PREFERRED EMBODIMENTS

A manufacturing method and a manufacturing apparatus for Baumkuchen according to one embodiment of the present invention will be described in detail with reference to FIGS. 1(a) to 8.

The manufacturing method of the Baumkuchen employed in the embodiment will be described first. The embodiment is similar to the prior-art manufacturing method in that application of batter around a whole outer circumference of a spit and baking of the applied batter are repeated alternately to successively stack layers of cake to thereby manufacture the Baumkuchen. In the embodiment, the batter applied onto opposite end portions of the spit is scraped off in early few repetitions of application and baking of the batter to thereby suppress the above-described shape distortion of the Baumkuchen.

To put it concretely, manufacturing of the Baumkuchen of the embodiment is carried out by using the following procedure.

Figure 1:
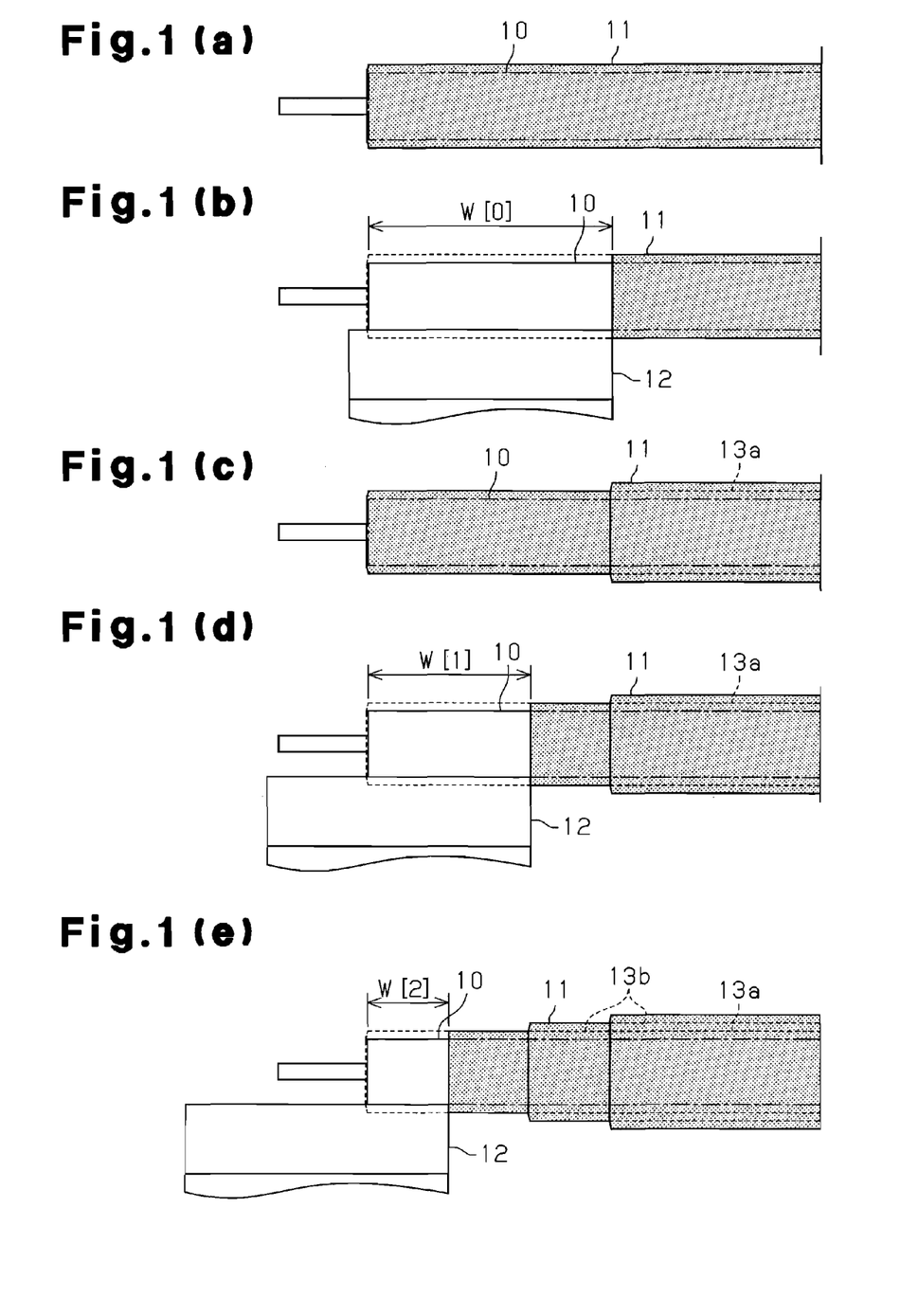
FIGS. 1(a) to 1(e) are drawings for explaining a manufacturing procedure of a Baumkuchen in an embodiment of the present invention.

1) First, as shown in FIG. 1(*a*), batter 11 is applied around the whole outer circumference of the spit 10.

2) Before moving on to baking of the applied batter 11, the batter 11 of width W[0] is scraped off the outer circumferences of the opposite end portions of the spit 10 as shown in FIG. 1(*b*). At this time, the batter 11 is scraped off by pushing flat scrapers (spatulas) 12 each having a distal end portion made of elastic material such as silicon rubber against outer circumferential surfaces of the spit 10. After scraping the batter 11 off the opposite end portions in this way, the batter 11 remaining on the spit 10 is baked.

3) After the baking, the batter 11 is applied around the whole outer circumference of the spit 10 as shown in FIG. 1(*c*). By this time, a baked cake layer 13*a* has been formed on the outer circumference of the central portion of the spit 10. The batter 11 is applied on this layer 13*a*. On the other hand, at the opposite end portions of the spit 10 which the batter 11 has been scraped off after the previous application, the batter 11 is directly applied onto the outer circumferences of the spit 10.

4) Next, as shown in FIG. 1(*d*), the baking is carried out after the batter 11 is scraped off the opposite end portions of the spit 10 again by using the scrapers 12. Widths W[1] of the batter 11*b* to be scraped off at this time are smaller than those in the previous scraping off (W[1]<W[0]).

5) In the third application and baking of the batter 11, the applied batter 11 is scraped off the opposite end portions of the spit 10 as shown in FIG. 1(*e*) before baking. Widths W[2] of the batter 11 to be scraped off at this time are yet smaller than the previous widths (W[2]<W[1]).

6) In the following fourth application and baking of the batter 11, the batter 11 is not scraped off. Baking is carried out in a state in which the batter 11 has been applied around the whole outer circumference of the spit 10 including the opposite end portions as shown in FIG. 1(*f*).

7) After this, the batter 11 is not scraped off and the application of the batter 11 around the whole outer circumference of the spit 10 and baking of it are repeated the required number of times to manufacture the Baumkuchen.

8) The baked Baumkuchen is removed from the spit 10 and is cut into desired dimensions and shapes.

Figure 2:
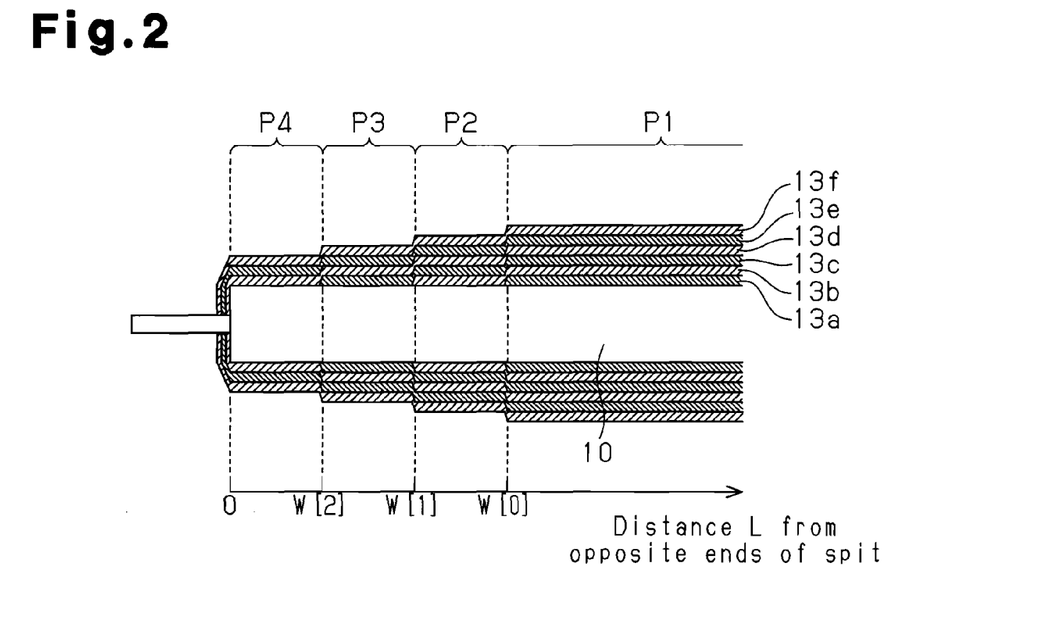
FIG. 2 is a cross-sectional view showing a cross-sectional shape of the Baumkuchen when six layers of cake are formed by a manufacturing method of the embodiment.

FIG. 2 shows a cross-section of the Baumkuchen when the application and baking of the batter 11 have been repeated six times during manufacturing. As shown in this drawing, at a portion P1 at a distance L of W[0] from the opposite ends of the spit 10 and where the above-described scraping off of the batter 11 has never been carried out, six cake layers (13*a* to 13*f*) are formed. On the other hand, at a portion P2 at a distance L of W[1] to W[0], only five layers (13*b* to 13*f*) are formed. At a portion P3 at a distance L of W[2] to W[1], only four layers (13*a* to 13*d*) are formed. At a portion P4 at a distance L of W[2], only three layers (13*a* to 13*c*) are formed.

Figure 3:
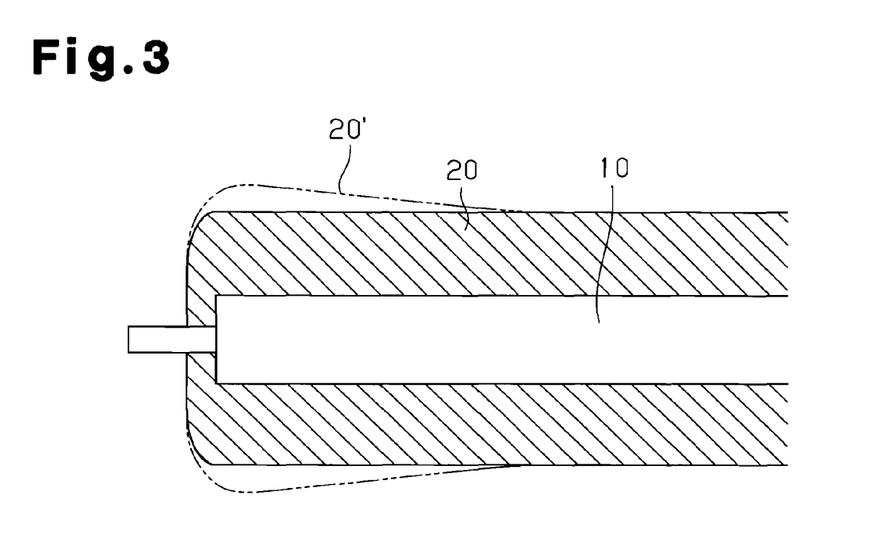
FIG. 3 is a cross-sectional view for comparing the cross-sectional shape of the Baumkuchen manufactured by the manufacturing method of the embodiment with the cross-sectional shape of a Baumkuchen manufactured by a prior-art manufacturing method.

FIG. 3 shows a cross-sectional shape of the Baumkuchen 20 manufactured by the above-described manufacturing method of the embodiment. In the drawing, a cross-sectional shape of a Baumkuchen 20' manufactured by a prior-art manufacturing method in which the scraping off of the batter 11 is not carried out at all and the application and baking of the batter 11 are simply repeated is also shown with an alternate long and short dashed line. In the manufacturing method of the embodiment, the opposite end portions of the Baumkuchen 20 have one to three fewer cake layers than the central portion and have a smaller outside diameter than a normal diameter as a result of the above-described scraping off of the batter 11. Therefore, by employing the manufacturing method of the embodiment, it is possible to suitably suppress partial increase in the outside diameter at the opposite end portions of the Baumkuchen.

In order to make the outside diameter of the Baumkuchen 20 to be manufactured substantially uniform throughout the length, it is necessary to properly adjust the scraping widths of the batter 11 and the number of times to perform scraping off. For example, the greater the difference between outside diameters of the opposite end portions and the outside diameter of the central portion of the Baumkuchen manufactured without carrying out the above-described scraping off of the batter 11 at all, the greater number of times the batter 11 needs to be scraped off. Moreover, the greater the widths of the portions at which the outside diameter partially increases, the greater the widths of batter 11 that need to be scraped off.

It is possible to estimate the approximate proper number of times to perform scraping off of the batter 11 from the outside shape of the Baumkuchen 20' manufactured by simply repeating the application and baking of the batter 11 without carrying out the scraping off. In other words, a mean layer thickness tm (mean value of the thickness of one layer of the cake layers 13) of the cake of the Baumkuchen 20' manufactured as described above and a thickness T (a distance from an outer circumference to an inner circumference) of each portion of the Baumkuchen are measured. At a portion where the thickness T of the Baumkuchen 20' is greater than that of the central portion by about the mean layer thickness tm of the cake, it is possible to make the thickness of the portion substantially equal to that of the central portion by carrying out the scraping off once to reduce the number of layers by one. Similarly, the scraping off may be carried out twice at a portion having a thickness greater by a thickness about double the mean layer thickness tm of the cake and the scraping off may be carried out three times at a portion having a thickness greater by a thickness that is about three times the mean layer thickness tm. In this way, by carrying out the scraping off the number of times corresponding to a difference ΔT between the thickness at each portion and the thickness at the central portion, the thickness T of the Baumkuchen is expected to be substantially uniform throughout the length.

Figure 4:
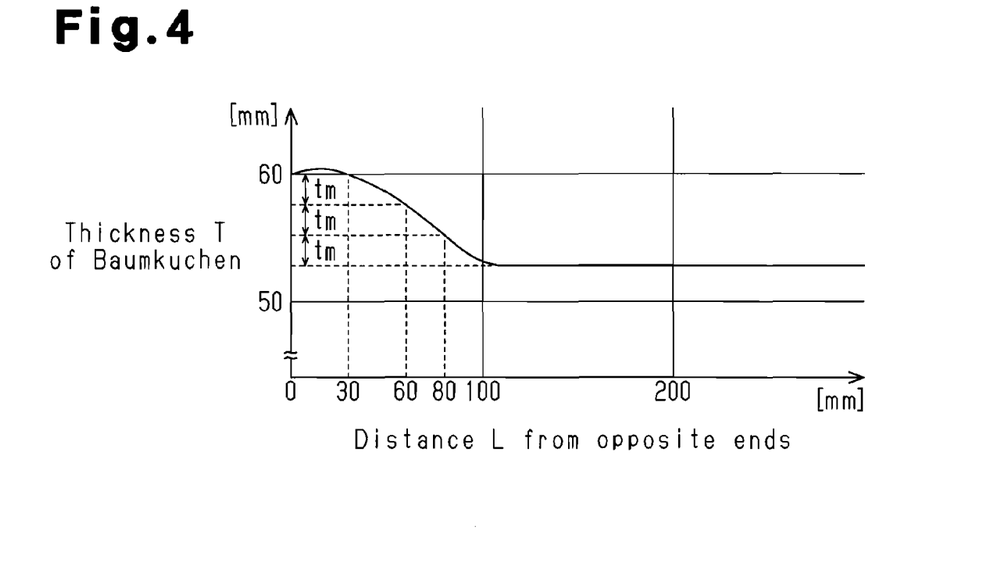
FIG. 4 is a graph showing a relationship between the distance from an end of the Baumkuchen manufactured by the prior-art manufacturing method and an outside diameter of the Baumkuchen.

FIG. 4 shows an example of the measurement results of the thicknesses T of the respective portions of the Baumkuchen 20' by relating it to the distance L from the opposite ends. According to the measurement results shown in the drawing as the example, the mean value of the thickness of the central portion of the Baumkuchen 20' is "about 53 mm". The mean layer thickness tm of the cake of the Baumkuchen 20' is "about 92.3 mm". In the example in the drawing, the difference ΔT from the thickness of the central portion is about three times the mean layer thickness tm of the cake at the portions at the distance L of "about 30 mm" or shorter from the opposite ends. The thickness difference ΔT at the portion at the distance L of "about 60 mm" from the opposite ends is about double the mean layer thickness tm. The thickness difference ΔT at the portion at the distance of about "60 to 80 mm" is about the same as the mean layer thickness tm. Therefore, in this case, by carrying out the scraping off of the batter 11 three times at the portion at the distance L of "30 mm" or shorter from the opposite ends, twice at the portion at the distance L of "30 to 60 mm", and one time at the portion at the distance L of "60 to 80 mm", respectively, the outside diameter of the Baumkuchen is expected to become substantially constant throughout the length. To put it concretely, by carrying out scraping off of the batter 11 at the portion at the distance L of "80 mm" or shorter from the opposite ends of the spit 10 after the first application of the batter 11, at the portion at the distance L of "60 mm" or shorter after the second application, and at the portion at the distance L of "30 mm" or shorter after the third application, the shape distortion is expected to be suppressed. As a result of actual manufacturing while scraping off the batter 11 under such conditions, it has been found out that the outside diameter of the Baumkuchen becomes substantially uniform throughout the length.

As described above, in the manufacturing method of the Baumkuchen of the embodiment, the batter 11 is scraped off the outer circumferences of the opposite end portions of the spit 10 before baking during the early stage of the manufacturing to thereby reduce the number of cake layers at the opposite end portions and reduce the outside diameters of the opposite end portions from the normal outside diameters. As a result, it is possible to properly avoid a problem in the prior-art manufacturing method, i.e., the partial increase of the outside diameter at the opposite end portions. Moreover, since the batter 11 is scraped off during the early stage of the manufacturing in which the baked cake layers 13 do not exist yet, it is possible to easily carry out scraping off of the batter without fears of damage to and burning of the cake layers 13 which have been baked already. Furthermore, if the widths and the number of times of the scraping off of the batter 11 are specified in advance, it is possible to properly suppress the shape distortion of the Baumkuchen only by a mechanical routine that does not require special judgment of the situation. Therefore, the manufacturing method of the embodiment does not require skill of a worker and automation of the work does not require exacting control. Consequently, it is easy to introduce the method.

Next, the manufacturing apparatus for the Baumkuchen of the embodiment for automating the manufacturing of the Baumkuchen by the method described above will be described. The manufacturing apparatus for the Baumkuchen of the embodiment is basically achieved by adding scraping mechanisms for carrying out scraping off of the batter and a controller for the mechanism to a prior-art manufacturing apparatus.

Figure 5:
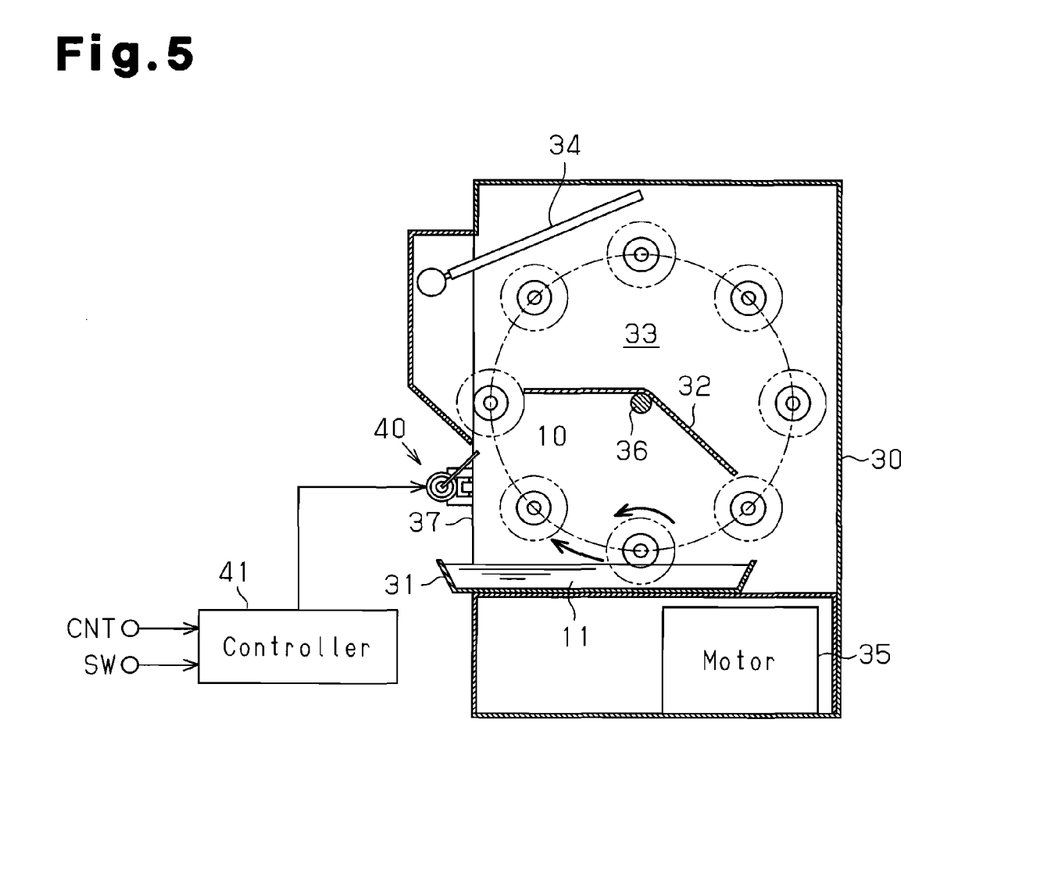
FIG. 5 is a simplified diagram schematically showing a structure of the manufacturing apparatus for Baumkuchen according to an embodiment of the invention.

FIG. 5 schematically shows a cross-sectional structure of the manufacturing apparatus for the Baumkuchen of the embodiment. In a lower portion of a case 30 of the manufacturing apparatus substantially formed in a shape of a rectangular parallelepiped, a batter tank 31 for storing the batter 11 is disposed. The batter 11 is successively added into the batter tank 31 so as to constantly maintain the same liquid level. In an upper portion of the case 30, a baking furnace 33 defined by outer walls of the case 30 and a heat shield plate 32 disposed at a central portion of the case 30 is formed. In an upper portion of the baking furnace 33, a burner 34 is disposed to heat the inside.

On the other hand, a plurality of (eight in the drawing) spits 10 are disposed in the case 30. Each of the spits 10 formed in a columnar shape rotates on its axis due to power from a motor 35 disposed in a lowermost portion of the case 30. Moreover, each spit 10 revolves in the case 30 about a revolution axis 36 supported in the central portion of the case 30 while making a circular orbit C clockwise in the drawing so as to alternately pass through the batter tank 31 and the baking furnace 33 due to the power of the motor 35. Each spit 10 passes through the batter tank 31 while rotating and, as a result, the batter 11 is applied to the whole outer circumference of the spit 10. Moreover, each spit 10 passes through the baking furnace 33 and, as a result, the applied batter 11 is baked.

In a front side wall (left side wall in the drawing) 30a of the case 30, a window 37 through which the spits 10 are attached and detached and a condition of baking of the Baumkuchen is checked is formed. On left and right opposite sides of the window 37, scraping mechanisms 40 for scraping the batter 11 off the outer circumferences of the opposite end portions of the spit 10 are provided, respectively. Operations of the scraping mechanisms 40 are respectively controlled by a controller 41. Connected to this controller 41 are a counter CNT for counting the number of orbits (the number of revolutions) of the spit 10 from the start of manufacturing, i.e., the number of repetitions of the application and baking of the batter 11, and a detection switch SW to be closed when any of the spit 10 moves to a position where scraping off of the batter 11 is to be carried out by the scraping mechanisms 40.

Figure 6:
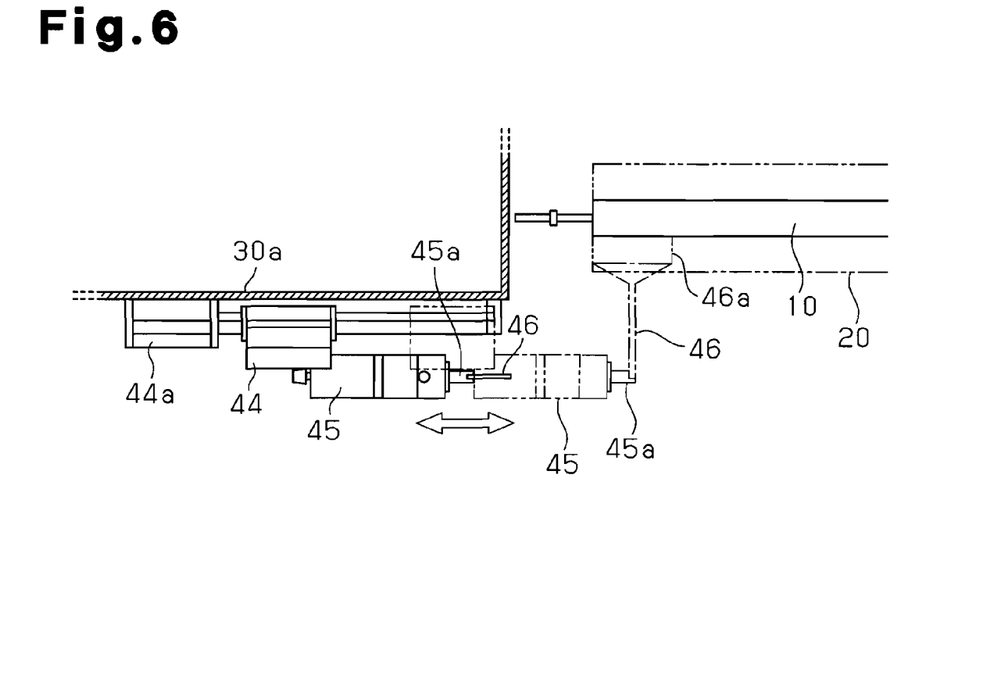
FIG. 6 is a drawing showing both a plan structure of a scraping mechanism employed for the manufacturing apparatus and a cross-sectional structure of a portion around the mechanism.

Next, the scraping mechanisms 40 will be described. FIG. 6 shows a plan structure of the scraping mechanism 40 and a partial cross-sectional structure of a portion around the mechanism 40. Although one scraping mechanism 40 is provided on each of the left and right sides of the window 37, FIG. 6 shows only one of them. The two scraping mechanisms 40 have the same structures. As shown in this drawing, the scraping mechanism 40 is provided with a linear guide mechanism (a ball screw mechanism or a linear guide mechanism) 44 fixed to the front side wall 30a of the case 30. Onto the linear guide mechanism 44, a servomechanism 45 is mounted to be able to move linearly in an axial direction of the spit 10. The linear guide mechanism 44 is provided with an actuator 44a for driving the servomechanism 45 in the axial direction of the spit 10. Operation of the actuator 44a is controlled by the controller 41 (see FIG. 5).

To a pivot shaft 45a of the servomechanism 45, a scraper 46 is fixed for scraping the batter 11 off the outer circumference of the spit 10. The scraper 46 extends from the pivot shaft 45a of the servomechanism 45 in a direction orthogonal to an extending direction of the pivot shaft 45a and a wide distal end portion 46a of the scraper 46 is made of elastic resin such as silicon rubber. The scraper 46 is disposed so that the distal end portion 46a becomes parallel to an axis of the spit 10. A width of the distal end portion 46a is equal to or greater than the conceivable maximum width of scraping off of the batter 11.

Figure 7:
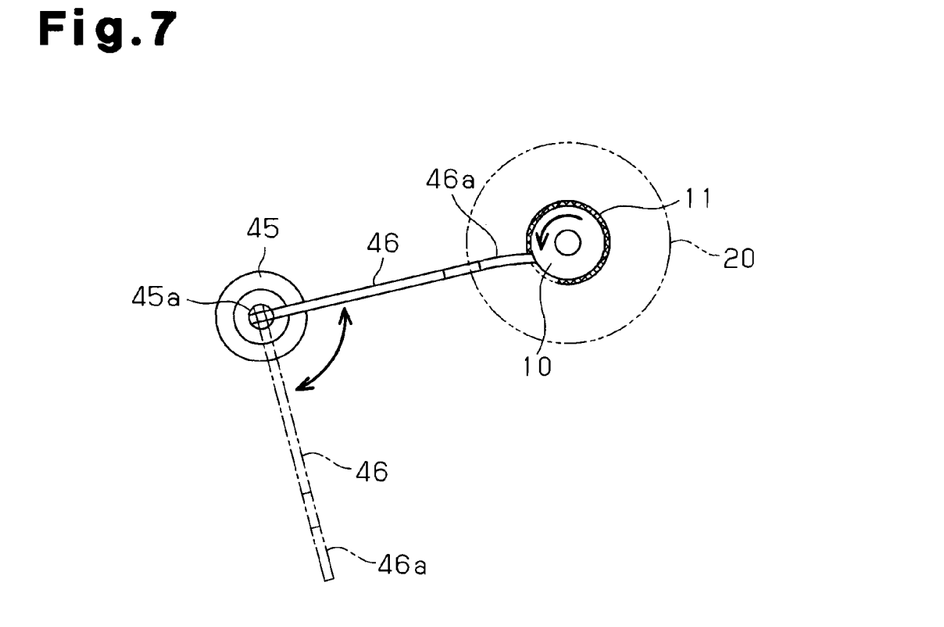
FIG. 7 is a drawing showing an operating manner of a scraper of the scraping mechanism.

As shown in FIG. 7, the scraper 46 is moved to such a position that the distal end portion 46a of the scraper 46 is brought into contact with an outer circumferential surface of the spit 10 as the pivot shaft 45a of the servomechanism 45 turns. The distal end portion 46a of the scraper 46 pushed against the outer circumferential surface of the spit 10 at this time scrapes off the batter 11 applied to the outer circumference as the spit 10 rotates. Hereafter, a pivot position of the scraper 46 at this time is referred to as a "scraping position". On the other hand, when the scraping off is not carried out, the scraper 46 is caused to retreat to a position shown with an alternate long and short dashed line in the drawing by pivoting of the servomechanism 45. The scraper 46 at this time is positioned in a position at a sufficient distance from the outer circumference of the spit 10 so as not to interfere with the Baumkuchen 20 formed on the outer circumference of the spit 10. Hereafter, the pivot position of the scraper 46 at this time is referred to as a "retreat position". In the embodiment, the scraping position of the scraper 46 corresponds to the "first position" and the retreat position corresponds to the "second position".

On the other hand, the scraper 46 is also driven in the axial direction of the spit 10 by the actuator 44a of the linear guide mechanism 44. By displacement of the spit 10 in the axial direction of the spit 10, a width of contact between the distal end portion 46a of the scraper 46 and the outer circumference of the spit 10 in the scraping position, i.e., the width of scraping off of the batter 11 can be changed arbitrarily.

Figure 8:
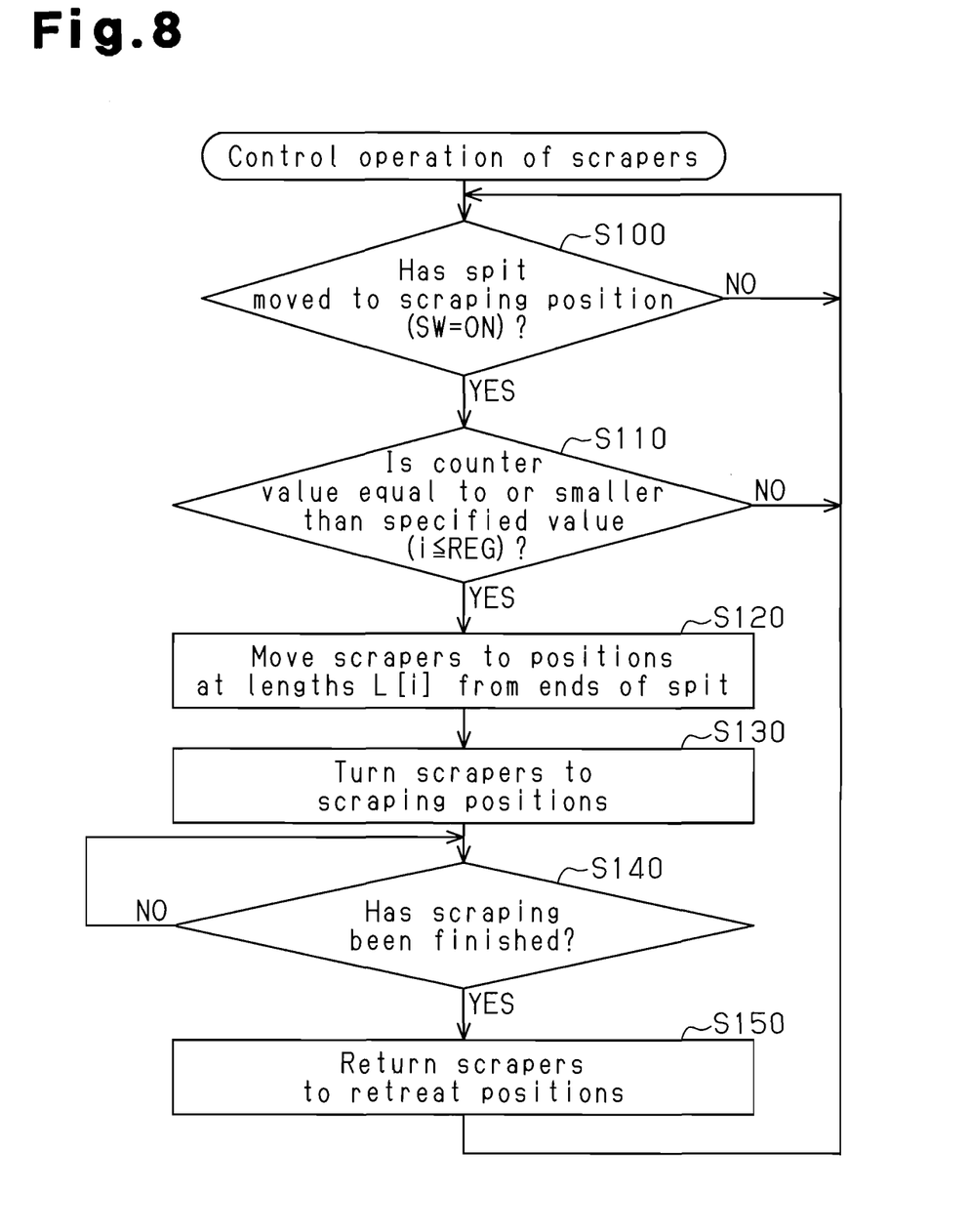
FIG. 8 is a flowchart of control of the operation of the scraper, which is carried out by a controller of the manufacturing apparatus of the embodiment.

Next, the control of the operation of the scraper 46 by the controller 41 in the manufacturing apparatus for the Baumkuchen of the embodiment structured as described above will be described. At the start of the manufacturing of the Baumkuchen, the scraper 46 is positioned in the retreat position. A count value i of the counter CNT is reset to "0" at the start of the manufacturing of the Baumkuchen, and then counts up by "1" every time the spit 10 makes one revolution, i.e., every time one cycle of application and baking of the batter 11 is carried out.

During manufacturing of the Baumkuchen, the controller 41 is always checking to be sure that neither the spit 10 has moved to the position where scraping off is to be carried out by the scraping mechanisms 40, nor that the detection switch SW is closed (S100). If the detection switch SW is closed (S100: YES), the controller 41 moves the processing to step S110 to read in the count value i from the counter CNT and determine whether or not the number of orbits of the spit 10 after the start of manufacturing, i.e., the number of repetitions of the application and baking of the batter 11 is not greater than a specified value Nreg. The specified value Nreg is a value specified in advance as the number of times the scraping off of the batter 11 is carried out and is stored in advance as a constant in the controller 41. In the embodiment, the specified value Nreg is set to "2" and the scraping off of the batter 11 is carried out three times for each spit 10 during manufacturing of the Baumkuchen. If the count value i of the counter CNT exceeds the specified value Nreg (S110: NO), the controller 41 returns the processing to step S100 again. In this case, the controller 41 is kept on standby until the manufacturing is finished.

If the count value i of the counter CNT is not greater than the specified value Nreg (S110: YES), the controller 41 first drives the actuator 44a of the linear guide mechanism 44 to move the scraper 46 to such a position that the width of contact between the distal end portion 46a of the scraper 46 and the outer circumference of the spit 10, i.e., the width of scraping off of the batter 11 becomes a value "W[i]" individually set for each time for carrying out the scraping off (S120). The set value W[i] of the scraping width for each time is stored in advance as a constant in the controller 41 similarly to the above specified value Nreg. Incidentally, in the embodiment, the scraping width W[0] for the first time is set to "80 mm", the scraping width W[1] for the second time is set to "60 mm", and the scraping width W[2] for the third time is set to "30 mm", respectively.

Next, the controller 41 turns the servomechanism 45 to move the scraper 46 to the scraping position to start the scraping of the batter 11 off the outer circumferential surface of the spit 10 (S130). The controller 41 retains the scraper 46 in the scraping position until the scraping off of the batter 11 is finished. When the scraping off is finished (S150: YES), the controller 41 drives the actuator 44a and the servomechanism 45 to return the scraper 46 to an initial position (S160). Whether or not the scraping off of the batter 11 has been finished can be easily determined based on time that has elapsed since the scraping off started. In other words, if the scraper 46 is retained in the scraping position until the time that has elapsed since the distal end portion 46a of the scraper 46 was pushed against the outer circumferential surface of the spit 10 becomes at least equal to time taken for one rotation of the spit 10 or longer, it is possible to scrape the batter 11 off the whole circumference of the target portion of the spit 10. When one scraping operation of the spit 10 has been finished in the above manner, the controller 41 returns the processing to step S100 again and is on standby until the next spit 10 moves to the position where the scraping mechanisms 40 are disposed.

According to the above-described embodiment, the following advantages can be obtained.

(1) In the embodiment, the batter 11 is scraped off the outer circumferences of the opposite end portions of the spit 10 only until the number of repetitions of the application of the batter 11 onto the outer circumference of the spit 10 and baking of the applied batter 11 reaches the specified value and during a period after the application of the batter 11 until the baking of the batter 11. As a result, the number of cake layers at the opposite end portions of the Baumkuchen where the outside diameter partially increases when the application and baking of the batter 11 are simply repeated becomes smaller than that at the other portion and the outside diameters of the opposite end portions become smaller than normal outside diameters. Therefore, it is possible to suppress shape distortion of the Baumkuchen and by extension to enhance quality, yields, and productivity.

(2) Since the batter 11 is scraped off the opposite end portions of the spit 10 only in the early stage of manufacturing, it is possible to carry out the scraping off of the batter 11 without fear of damage to and burning of the cake layers which have been baked already. Therefore, it is possible to properly suppress shape distortion without finely adjusting a force applied in scraping off of the batter 11.

(3) The width and the proper number of scraping off of the batter 11 suitable for suppressing the shape distortion can be obtained in advance. By specifying the conditions of carrying out of the scraping off in advance, it is possible to properly suppress shape distortion of the Baumkuchen only by a mechanical routine that does not require special judgment of the situation. Therefore, skill of a worker is not required even when the batter 11 is scraped off by manual work. Moreover, if the work is automated, exacting control is not required. Consequently, it is easy to introduce this method.

(4) The structure of the manufacturing apparatus for the Baumkuchen of the embodiment is basically achieved only by adding scraping mechanisms 40, the controller 41 for them, and the like to a prior-art manufacturing apparatus. Therefore, the manufacturing apparatus can be achieved only by making minor improvements to the prior-art manufacturing apparatus. Even in a case of newly forming the manufacturing apparatus, a major part of the design of the prior-art manufacturing apparatus can be utilized. As a result, it is possible to introduce the manufacturing apparatus for the Baumkuchen of the embodiment at relatively low cost.

(5) The specified value Nreg and the scraping width W[i] for each orbit stored as constants in the controller 41 can be changed in a programmable way by rewriting the constants stored in the controller 41. Therefore, it is possible to easily change the scraping width and the number of scraping off according to the type of Baumkuchen to be manufactured and to finely adjust the scraping width and the number of scraping off in a testing stage for finding proper values and it is possible to impart high versatility to the manufacturing apparatus.

The above embodiment may be modified as follows.

Since the proper values of the scraping width and the number of scraping off of the batter 11 change according to a shape and dimensions, and properties of the batter of the Baumkuchen to be manufactured, these values need be changed as necessary according to the situation. The method of obtaining the proper values is described in the above embodiment.

Although the scraping width of the batter 11 at the opposite end portions of the spit 10 is discretely reduced for each scraping off in the above-described embodiment, the scraping width for each scraping off may be fixed if the shape distortion of the Baumkuchen can be suppressed to an allowable level.

Although the scraping mechanism 40 is structured such that the scraper 46 can operate through two degrees of freedom (the linear movement in the axial direction of the spit 10 and the pivoting about the pivot shaft 45a of the servomechanism 45 in the above-described embodiment), the structure of the scraping mechanism 40 is not limited to this but may be changed as necessary. For example, if the scraping width of the batter 11 for each scraping off is fixed as described above, the mechanism for linearly moving the scraper 46 in the axial direction of the spit 10 can be omitted. Furthermore, the movement of the scraper 46 between the scraping position and the retreat position may be carried out through the linear movement of the scraper 46 in the radial or axial direction of the spit 10 besides the pivoting in the above-described embodiment. It is needless to say that the structure of the manufacturing apparatus other than the scraping mechanism 40 is not limited to the structure taken as an example in the above-described embodiment but may be changed as necessary.

The shape and dimensions of the scraper 46 used for scraping off the batter 11 and material of the distal end portion 46a are not limited to those taken as examples in the above-described embodiment but may be changed as necessary. As long as the tool can scrape the batter 11 off the outer circumferences of the opposite end portions of the spit 10, the tool used for it may be changed arbitrarily.

Although the case in which the scraping mechanisms 40 are mounted in the manufacturing apparatus for the Baumkuchen to automate the scraping off of the batter 11 has been described in the above-described embodiment, the scraping off of the batter 11 may be carried out by manual work. Even in this case, it is possible to easily and properly suppress the shape distortion of the Baumkuchen only by relatively simple work that does not require special skill.

The invention claimed is:

1. A method for manufacturing a Baumkuchen having a uniform diameter throughout the length of the Baumkuchen, the method comprising:

rotating a spit having an outer circumference, a first end, a second end opposite the first end, a length extending from the first end to the second end and a central portion between the first and second end;

in a first applying operation, applying batter around the entire outer circumference and the length of the rotating spit;

carrying out a first scraping operation by completely scraping off the batter, from the first applying operation, from the outer circumference for a first distance extending from the first end of the rotating spit toward the central portion of the rotating spit, and from the second end of the rotating spit toward the central portion of the rotating spit while retaining batter for a length extending between the first and second end of the rotating spit; and then baking the batter in a first baking operation while rotating the spit;

in a second applying operation, further applying batter around the entire outer circumference and the entire length of the rotating spit and on the baked batter from the first baking operation;

carrying out a second scraping operation by completely scraping off batter, from the second applying operation, from the outer circumference of the rotating spit for a second distance that extends from the first end of the rotating spit toward the central portion of the rotating spit and from the second end of the rotating spit toward the central portion of the rotating spit, wherein the second distance is less than the first distance and only scrapes off portions of batter from the second applying operation; and then baking the batter in a second baking operation while rotating the spit;

repeating the second applying operation, the second scraping operation and the second baking operation a specified number of times, wherein each repeated second scraping operation completely scrapes off batter from the rotating spit for a distance that is less than the distance of the previously applied second applying operation;

in a third applying operation, further applying batter around the entire outer circumference and the entire length of the rotating spit, and on batter previously baked from the second baking operations; and then baking the batter in a third baking operation while rotating the spit;

repeating the third applying operation and the third baking operation until the resulting Baumkuchen has a plurality of layers in a region defined by a baked layer resulting from the first baking operation; and wherein the resulting Baumkuchen has a uniform diameter throughout the length of the Baumkuchen;

wherein the specified number of times the second applying, second scraping and second baking operation is repeated is obtained by performing the steps of, producing a test Baumkuchen that has been produced only by applying batter to the entire spit, baking the batter and repeating the applying and baking steps to produce a test Baumkuchen having multiple layers; and measuring a thickness of a central portion and a thickness of an end portion of said test Baumkuchen; and dividing the difference between the thickness of the end portion and the thickness of the central portion of the test Baumkuchen, by the mean value of the thickness of one layer of the test Baumkuchen to thus obtain the number of times to repeat the second applying, scraping and baking operation.

2. The manufacturing method for Baumkuchen according to claim 1, wherein the batter is scraped off by pushing a distal end of a flat scraper against a surface of the outer circumference of the spit.

* * * * *

UNITED STATES PATENT AND TRADEMARK OFFICE
CERTIFICATE OF CORRECTION

PATENT NO. : 8,945,650 B2  
APPLICATION NO. : 11/814715  
DATED : February 3, 2015  
INVENTOR(S) : Shinya Mizuguchi et al.

It is certified that error appears in the above-identified patent and that said Letters Patent is hereby corrected as shown below:

In the Specification:

On column 6, line 53, delete "AT" and add --$\Delta T$--

Signed and Sealed this  
Fourteenth Day of July, 2015

Michelle K. Lee  
*Director of the United States Patent and Trademark Office*